US010945185B2

United States Patent
Hong et al.

(10) Patent No.: US 10,945,185 B2
(45) Date of Patent: Mar. 9, 2021

(54) METHOD AND APPARATUS FOR SUPPORTING FAST LINK RECOVERY AND LINK STATUS REPORTING IN WIRELESS COMMUNICATION SYSTEM

(71) Applicant: LG Electronics Inc., Seoul (KR)

(72) Inventors: Jongwoo Hong, Seoul (KR); Taehun Kim, Seoul (KR); Daewook Byun, Seoul (KR); Bokyung Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/509,211

(22) Filed: Jul. 11, 2019

(65) Prior Publication Data

US 2020/0022054 A1 Jan. 16, 2020

(30) Foreign Application Priority Data

Jul. 11, 2018 (KR) ........................ 10-2018-0080535

(51) Int. Cl.
*H04W 36/30* (2009.01)
*H04W 76/19* (2018.01)
*H04W 24/04* (2009.01)
*H04W 36/00* (2009.01)
*H04B 17/327* (2015.01)
*H04W 36/08* (2009.01)
*H04W 74/08* (2009.01)

(52) U.S. Cl.
CPC ........ *H04W 36/305* (2018.08); *H04B 17/327* (2015.01); *H04W 24/04* (2013.01); *H04W 36/0085* (2018.08); *H04W 36/08* (2013.01); *H04W 76/19* (2018.02); *H04W 74/0833* (2013.01)

(58) Field of Classification Search
CPC .............. H04W 36/305; H04W 76/19; H04W 36/0085; H04W 24/04; H04W 36/08; H04B 17/327
See application file for complete search history.

(56) References Cited

U.S. PATENT DOCUMENTS

2011/0081903 A1* 4/2011 Cai .................... H04W 36/0058
455/424
2011/0242970 A1* 10/2011 Prakash ................ H04W 76/38
370/225

(Continued)

OTHER PUBLICATIONS

3rd Generation Partnership Project; Technical Specification Group Radio Access Network; NR; User Equipment (UE) procedures in Idle mode and RRC' Inactive state (Release 15), "3GPP TS 38.304 V15.0.0 (Jun. 2018)," Jun. 2018, 10 pages.

*Primary Examiner* — Jael M Ulysse
(74) *Attorney, Agent, or Firm* — Fish & Richardson P.C.

(57) ABSTRACT

A method and apparatus for supporting a fast link recovery and link status reporting in a wireless communication system is provided. When a node detects a radio link problem on a wireless backhaul link between integrated access and backhaul (IAB) nodes from the node to a donor node of an IAB network, the node reselects a cell operated by a gNB which is directly connected to the donor node, and performs a random access procedure towards the cell operated by the gNB to report information on the radio link problem to the cell. The donor node may establish a new path for the node.

14 Claims, 13 Drawing Sheets

(56) References Cited

U.S. PATENT DOCUMENTS

| | | | |
|---|---|---|---|
| 2011/0250892 A1* | 10/2011 | Gupta | H04W 36/0011 455/437 |
| 2012/0002537 A1* | 1/2012 | Bao | H04W 24/04 370/221 |
| 2012/0069732 A1* | 3/2012 | Xu | H04W 76/19 370/221 |
| 2012/0142336 A1* | 6/2012 | Van Phan | H04W 36/0033 455/423 |
| 2012/0314567 A1* | 12/2012 | Seo | H04W 24/04 370/228 |
| 2012/0327794 A1* | 12/2012 | Han | H04W 52/143 370/252 |
| 2012/0327801 A1* | 12/2012 | Seo | H04B 1/74 370/252 |
| 2013/0040558 A1* | 2/2013 | Kazmi | H04B 7/15507 455/9 |
| 2013/0084884 A1* | 4/2013 | Teyeb | H04W 48/04 455/456.1 |
| 2013/0143574 A1* | 6/2013 | Teyeb | H04W 36/0011 455/438 |
| 2013/0183971 A1* | 7/2013 | Tamaki | H04W 36/0061 455/436 |
| 2014/0200001 A1* | 7/2014 | Song | H04W 8/02 455/436 |
| 2014/0301371 A1* | 10/2014 | Maeda | H04W 36/32 370/331 |
| 2014/0307542 A1* | 10/2014 | Fujishiro | H04W 76/19 370/225 |
| 2015/0009888 A1* | 1/2015 | Pitakdumrongkija | H04B 7/15507 370/315 |
| 2015/0024757 A1* | 1/2015 | Bulakci | H04W 36/0088 455/437 |
| 2015/0181479 A1* | 6/2015 | Lin | H04W 24/04 370/331 |
| 2015/0181480 A1* | 6/2015 | Bulakci | H04W 36/0083 455/436 |
| 2016/0366632 A1* | 12/2016 | Cui | H04W 16/26 |
| 2018/0092139 A1* | 3/2018 | Novlan | H04W 56/001 |
| 2018/0124718 A1* | 5/2018 | Ng | H04B 7/15 |
| 2018/0279218 A1* | 9/2018 | Park | H04W 36/08 |
| 2018/0288823 A1* | 10/2018 | Hampel | H04W 76/15 |
| 2019/0014533 A1* | 1/2019 | Abedini | H04W 16/10 |
| 2019/0082363 A1* | 3/2019 | Park | H04W 36/0055 |
| 2019/0124696 A1* | 4/2019 | Islam | H04W 74/0833 |
| 2019/0223002 A1* | 7/2019 | Novlan | H04W 8/22 |
| 2019/0289500 A1* | 9/2019 | Abedini | H04W 72/044 |
| 2019/0289502 A1* | 9/2019 | Abedini | H04W 28/0278 |
| 2019/0372887 A1* | 12/2019 | Majmundar | H04W 40/22 |
| 2019/0394084 A1* | 12/2019 | Tsai | H04W 36/125 |
| 2019/0394738 A1* | 12/2019 | Abedini | H04W 74/0833 |
| 2020/0015147 A1* | 1/2020 | Malkamaki | H04L 1/1874 |

* cited by examiner

METHOD AND APPARATUS FOR SUPPORTING FAST LINK RECOVERY AND LINK STATUS REPORTING IN WIRELESS COMMUNICATION SYSTEM

CROSS-REFERENCE TO RELATED APPLICATIONS

Pursuant to 35 U.S.C. § 119 (e), this application claims the benefit of Korean Patent Application No. 10-2018-0080535, filed on Jul. 11, 2018, the contents of which are all hereby incorporated by reference herein in their entirety.

BACKGROUND OF THE INVENTION

Field of the Invention

The present invention relates to wireless communications, and more particularly, to a method and apparatus for supporting a fast link recovery and link status reporting in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

One of the potential technologies targeted to enable future cellular network deployment scenarios and applications is the support for wireless backhaul and relay links enabling flexible and very dense deployment of NR cells without the need for densifying the transport network proportionately.

Due to the expected larger bandwidth available for NR compared to LTE (e.g. mmWave spectrum) along with the native deployment of massive multiple-input multiple-output (MIMO) or multi-beam systems in NR creates an opportunity to develop and deploy integrated access and backhaul (IAB) links. This may allow easier deployment of a dense network of self-backhauled NR cells in a more integrated manner by building upon many of the control and data channels/procedures defined for providing access to UEs. Due to deployment of IAB links, relay nodes can multiplex access and backhaul links in time, frequency, or space (e.g. beam-based operation).

SUMMARY OF THE INVENTION

IAB nodes are connected via wireless backhaul links in IAB network. Due to nature of the wireless backhaul links, a link problem which is not common in wired backhaul links may occur on the wireless backhaul links. However, since IAB nodes are connected with multiple number of hops, when the link problem occurs, delay to report the problem would be large due to multiple number of hops. Furthermore, it may not be easy to recover the link problem on the wireless backhaul links. Even if the link problem on the wireless backhaul links is recovered, significant delay may happen.

In an aspect, a method performed by a node in a wireless communication system is provided. The method includes detecting a radio link problem on a wireless backhaul link between integrated access and backhaul (IAB) nodes from the node to a donor node of an IAB network, reselecting a cell operated by a gNB which is directly connected to the donor node, performing a random access procedure towards the cell operated by the gNB, and reporting information on the radio link problem to the cell.

In another aspect, a node in a wireless communication system is provided. The node includes a memory, a transceiver, and a processor, operably coupled to the memory and the transceiver. The node is configured to detect a radio link problem on a wireless backhaul link between integrated access and backhaul (IAB) nodes from the node to a donor node of an IAB network, reselect a cell operated by a gNB which is directly connected to the donor node, perform a random access procedure towards the cell operated by the gNB, and report, via the transceiver, information on the radio link problem to the cell.

In another aspect, a processor for a node in a wireless communication system is provided. The processor is configured to detect a radio link problem on a wireless backhaul link between integrated access and backhaul (IAB) nodes from the node to a donor node of an IAB network, reselect a cell operated by a gNB which is directly connected to the donor node, perform a random access procedure towards the cell operated by the gNB, and control the node to report information on the radio link problem to the cell.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
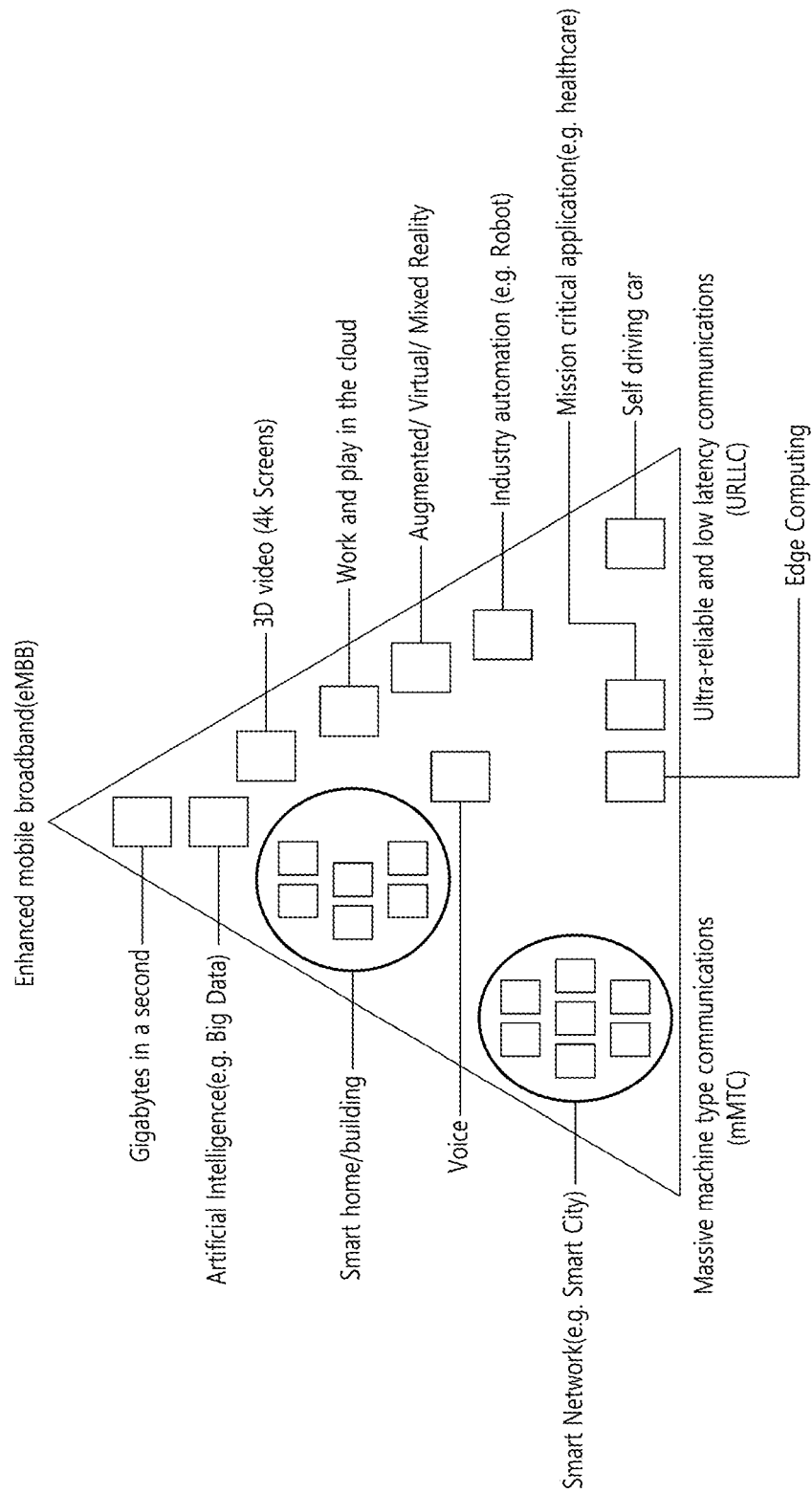
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
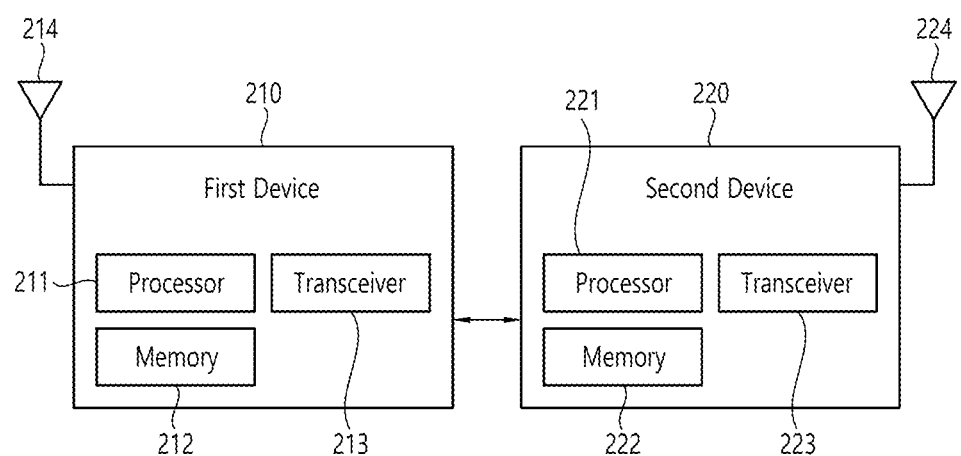
FIG. 2 shows an example of a wireless communication system to which the technical features of the present invention can be applied.

FIG. 2 shows an example of a wireless communication system to which the technical features of the present invention can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body.

For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
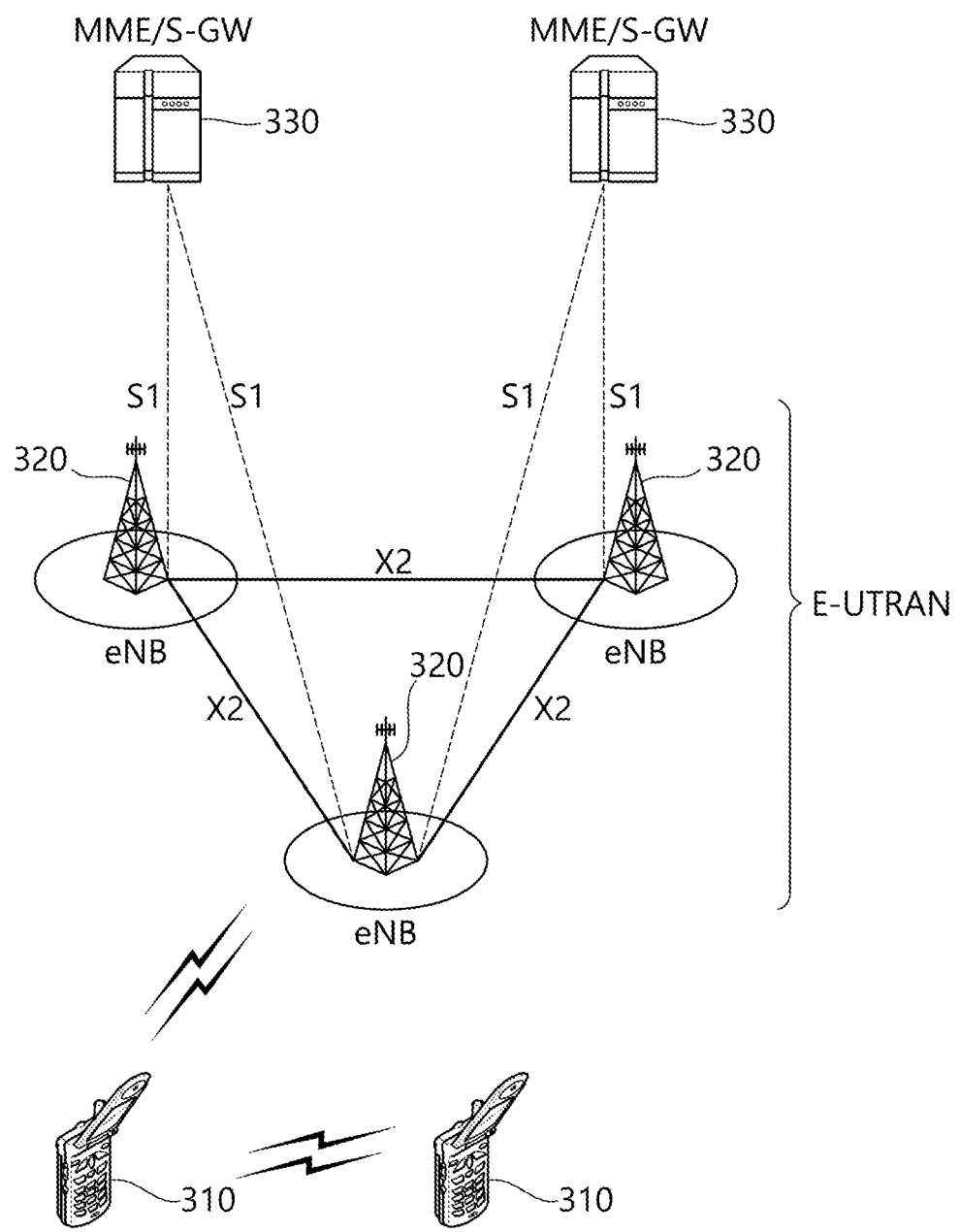
FIG. 3 shows an example of a wireless communication system to which the technical features of the present invention can be applied.

FIG. 3 shows an example of a wireless communication system to which the technical features of the present invention can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
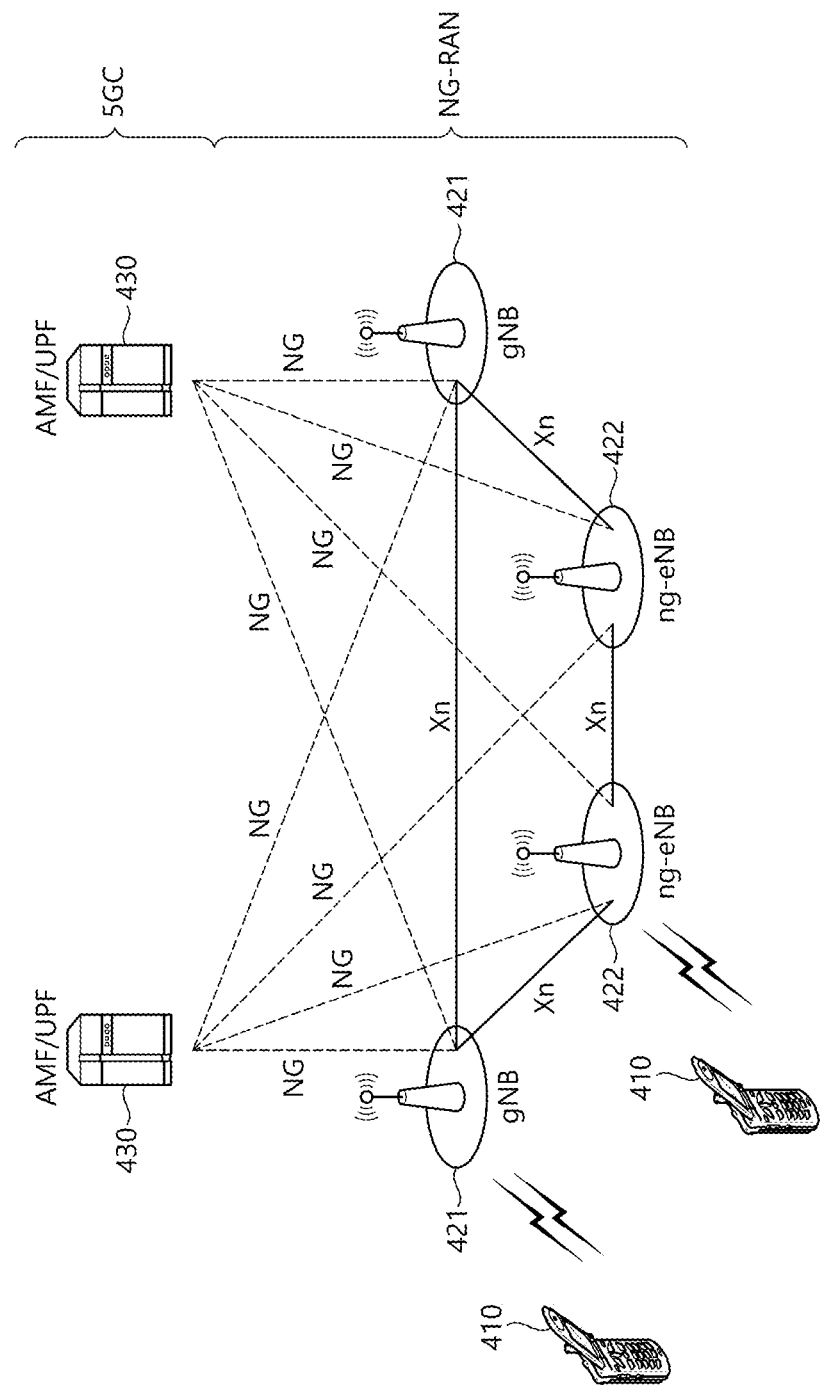
FIG. 4 shows another example of a wireless communication system to which the technical features of the present invention can be applied.

FIG. 4 shows another example of a wireless communication system to which the technical features of the present invention can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
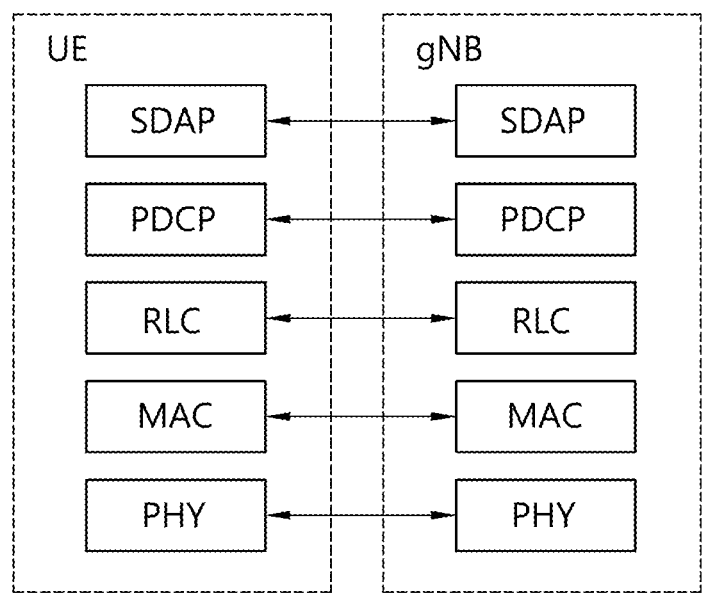
FIG. 5 shows a block diagram of a user plane protocol stack to which the technical features of the present invention can be applied.
Figure 6:
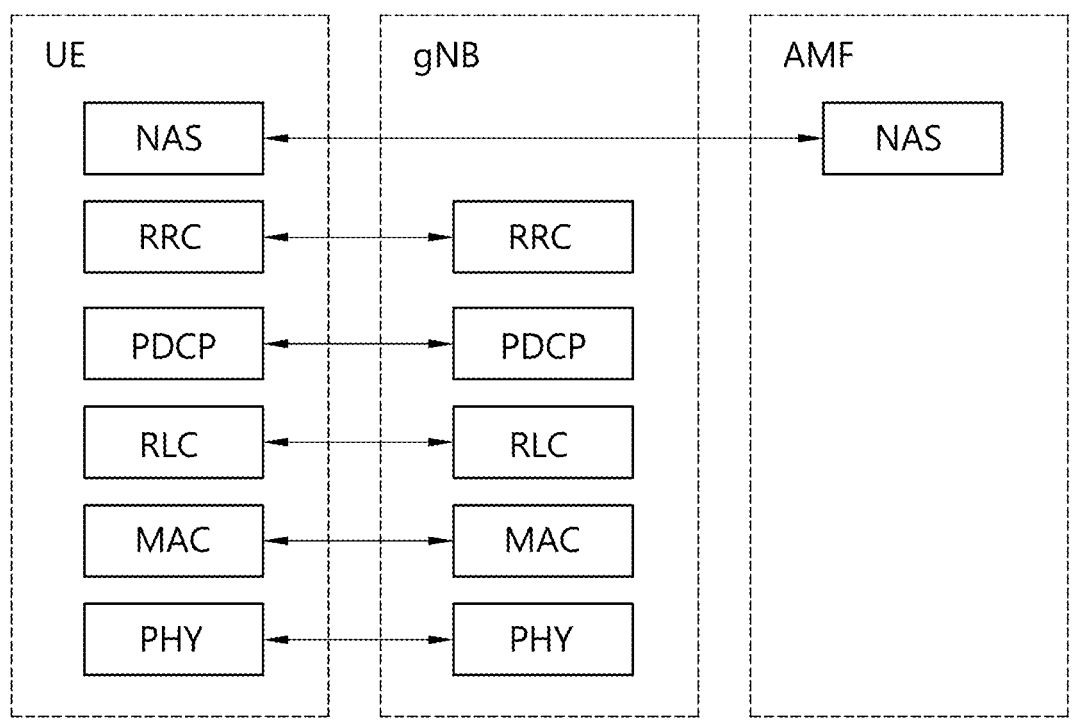
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Cell reselection evaluation process in NR is described. Section 5.2.4 of 3GPP TS 38.304 V15.0.0 (2018-06) may be referred.

Reselection priorities handling is described. Absolute priorities of different NR frequencies or inter-RAT frequencies may be provided to the UE in the system information, in the RRCRelease message, or by inheriting from another RAT at inter-RAT cell (re)selection. In the case of system information, a NR frequency or inter-RAT frequency may be listed without providing a priority (i.e. the field cellReselectionPriority is absent for that frequency). If priorities are provided in dedicated signaling, the UE shall ignore all the priorities provided in system information.

The UE shall only perform cell reselection evaluation for NR frequencies and inter-RAT frequencies that are given in system information and for which the UE has a priority provided.

The UE shall delete priorities provided by dedicated signaling when:
  the UE enters a different RRC state; or
  the optional validity time of dedicated priorities (T320) expires; or
  a PLMN selection is performed on request by NAS.

The UE shall only perform cell reselection evaluation for NR frequencies and inter-RAT frequencies that are given in system information and for which the UE has a priority provided.

The UE shall not consider any black listed cells as candidate for cell reselection.

The UE shall inherit the priorities provided by dedicated signaling and the remaining validity time (i.e. T320 in NR and E-UTRA), if configured, at inter-RAT cell (re)selection.

Measurement rules for cell re-selection is described. When evaluating Srxlev and Squal of non-serving cells for reselection purposes, the UE shall use parameters provided by the serving cell.

Following rules are used by the UE to limit needed measurements:

1> If the serving cell fulfils Srxlev> $S_{IntraSearchP}$ and Squal> $S_{IntraSearchQ}$, the UE may choose not to perform intra-frequency measurements.

1> Otherwise, the UE shall perform intra-frequency measurements.

1> The UE shall apply the following rules for NR inter-frequencies and inter-RAT frequencies which are indicated in system information and for which the UE has priority provided:

2> For a NR inter-frequency or inter-RAT frequency with a reselection priority higher than the reselection priority of the current NR frequency, the UE shall perform measurements of higher priority NR inter-frequency or inter-RAT frequencies.

2> For a NR inter-frequency with an equal or lower reselection priority than the reselection priority of the current NR frequency and for inter-RAT frequency with lower reselection priority than the reselection priority of the current NR frequency:

3> If the serving cell fulfils Srxlev> $S_{nonIntraSearchP}$ and Squal> $S_{nonIntraSearchQ}$, the UE may choose not to perform measurements of NR inter-frequencies or inter-RAT frequency cells of equal or lower priority.

3> Otherwise, the UE shall perform measurements of NR inter-frequencies or inter-RAT frequency cells of equal or lower priority.

Cells with cell reservations, access restrictions or unsuitable for normal camping is described. For the highest ranked cell (including serving cell) according to cell reselection criteria, for the best cell according to absolute priority reselection criteria, the UE shall check if the access is restricted.

If that cell and other cells have to be excluded from the candidate list, the UE shall not consider these as candidates for cell reselection. This limitation shall be removed when the highest ranked cell changes.

If the highest ranked cell or best cell according to absolute priority reselection rules is an intra-frequency or inter-frequency cell which is not suitable due to being part of the list of 5GS forbidden timing advances (TAs) for roaming or belonging to a PLMN which is not indicated as being equivalent to the registered PLMN, the UE shall not consider this cell and other cells on the same frequency, as candidates for reselection for a maximum of 300 seconds. If the UE enters into state any cell selection, any limitation shall be removed. If the UE is redirected under NR control to a frequency for which the timer is running, any limitation on that frequency shall be removed.

If the highest ranked cell or best cell according to absolute priority reselection rules is an inter-RAT cell which is not suitable due to being part of the list of forbidden TAs for roaming or belonging to a PLMN which is not indicated as being equivalent to the registered PLMN, the UE shall not consider this cell as a candidate for reselection for a maximum of 300 seconds. If the UE is redirected under NR control to a frequency for which the timer is running, any limitation on that frequency shall be removed.

NR Inter-frequency and inter-RAT cell reselection criteria is described. If threshServingLowQ is broadcast in system information and more than 1 second has elapsed since the UE camped on the current serving cell, cell reselection to a cell on a higher priority NR frequency or inter-RAT frequency than the serving frequency shall be performed if:

A cell of a higher priority NR or EUTRAN RAT/frequency fulfils Squal>Thresh$_{X, HighQ}$ during a time interval Treselection$_{RAT}$ Otherwise, cell reselection to a cell on a higher priority NR frequency or inter-RAT frequency than the serving frequency shall be performed if:

A cell of a higher priority RAT/frequency fulfils Srxlev>Thresh$_{X, HighP}$ during a time interval Treselection$_{RAT}$; and More than 1 second has elapsed since the UE camped on the current serving cell.

Cell reselection to a cell on an equal priority NR frequency shall be based on ranking for intra-frequency cell reselection which will be described below.

If threshServingLowQ is broadcast in system information and more than 1 second has elapsed since the UE camped on the current serving cell, cell reselection to a cell on a lower priority NR frequency or inter-RAT frequency than the serving frequency shall be performed if:

The serving cell fulfils Squal<Thresh$_{Serving, LowQ}$ and a cell of a lower priority NR or E-UTRAN RAT/frequency fulfils Squal>Thresh$_{X, LowQ}$ during a time interval Treselection$_{RAT}$.

Otherwise, cell reselection to a cell on a lower priority NR frequency or inter-RAT frequency than the serving frequency shall be performed if:

The serving cell fulfils Srxlev<Thresh$_{Serving, LowP}$ and a cell of a lower priority RAT/frequency fulfils Srxlev>Thresh$_{X, LowP}$ during a time interval Treselection$_{RAT}$; and More than 1 second has elapsed since the UE camped on the current serving cell.

Cell reselection to a higher priority RAT/frequency shall take precedence over a lower priority RAT/frequency if multiple cells of different priorities fulfil the cell reselection criteria.

Intra-frequency and equal priority inter-frequency cell reselection criteria is described. The cell-ranking criterion $R_s$ for serving cell and $R_n$ for neighboring cells is defined by Equation 1 and Table 1 below.

$$R_s = Q_{meas,s} + Q_{hyst}$$

$$R_n = Q_{meas,n} - Q\text{offset} \qquad [\text{Equation 1}]$$

TABLE 1

| | |
|---|---|
| $Q_{meas}$ | Reference signal received power (RSRP) measurement quantity used in cell reselections. |
| Qoffset | For intra-frequency: Equals to Qoffset$_{s,n}$ if Qoffset$_{s,n}$ is valid, otherwise this equals to zero.<br>For inter-frequency: Equals to Qoffset$_{s,n}$ plus Qoffset$_{frequency}$, if Qoffset$_{s,n}$ is valid, otherwise this equals to Qoffset$_{frequency}$. |

The UE shall perform ranking of all cells that fulfil the cell selection criterion S.

The cells shall be ranked according to the R criteria specified above by deriving $Q_{meas,n}$ and $Q_{meas,s}$ and calculating the R values using averaged RSRP results.

If rangeToBestCell is not configured, the UE shall perform cell reselection to the cell ranked as the best cell.

If rangeToBestCell is configured, then the UE shall perform cell reselection to the cell with the highest number of beams above the threshold (i.e. absThreshSS-Consolidation) among the cells whose R value is within rangeToBestCell of the R value of the cell ranked as the best cell. If there are multiple such cells, the UE shall perform cell reselection to the highest ranked cell among them. The reselected cell then becomes the highest ranked cell.

In all cases, the UE shall reselect the new cell, only if the following conditions are met:
the new cell is better ranked than the serving cell during a time interval $Treselection_{RAT}$;
more than 1 second has elapsed since the UE camped on the current serving cell.

Integrated access and backhaul (IAB) is described.

IAB-node refers RAN node that supports wireless access to UEs and wirelessly backhauls the access traffic. IAB-donor refers RAN node which provides UE's interface to core network and wireless backhauling functionality to IAB nodes.

IAB strives to reuse existing functions and interfaces defined for access. In particular, mobile-termination (MT), gNB-distributed unit (DU), gNB-central unit (CU), UPF, AMF and SMF as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The MT function has been defined a component of the mobile equipment. MT is referred to as a function residing on an IAB-node that terminates the radio interface layers of the backhaul Uu interface toward the IAB-donor or other IAB-nodes.

Figure 7:
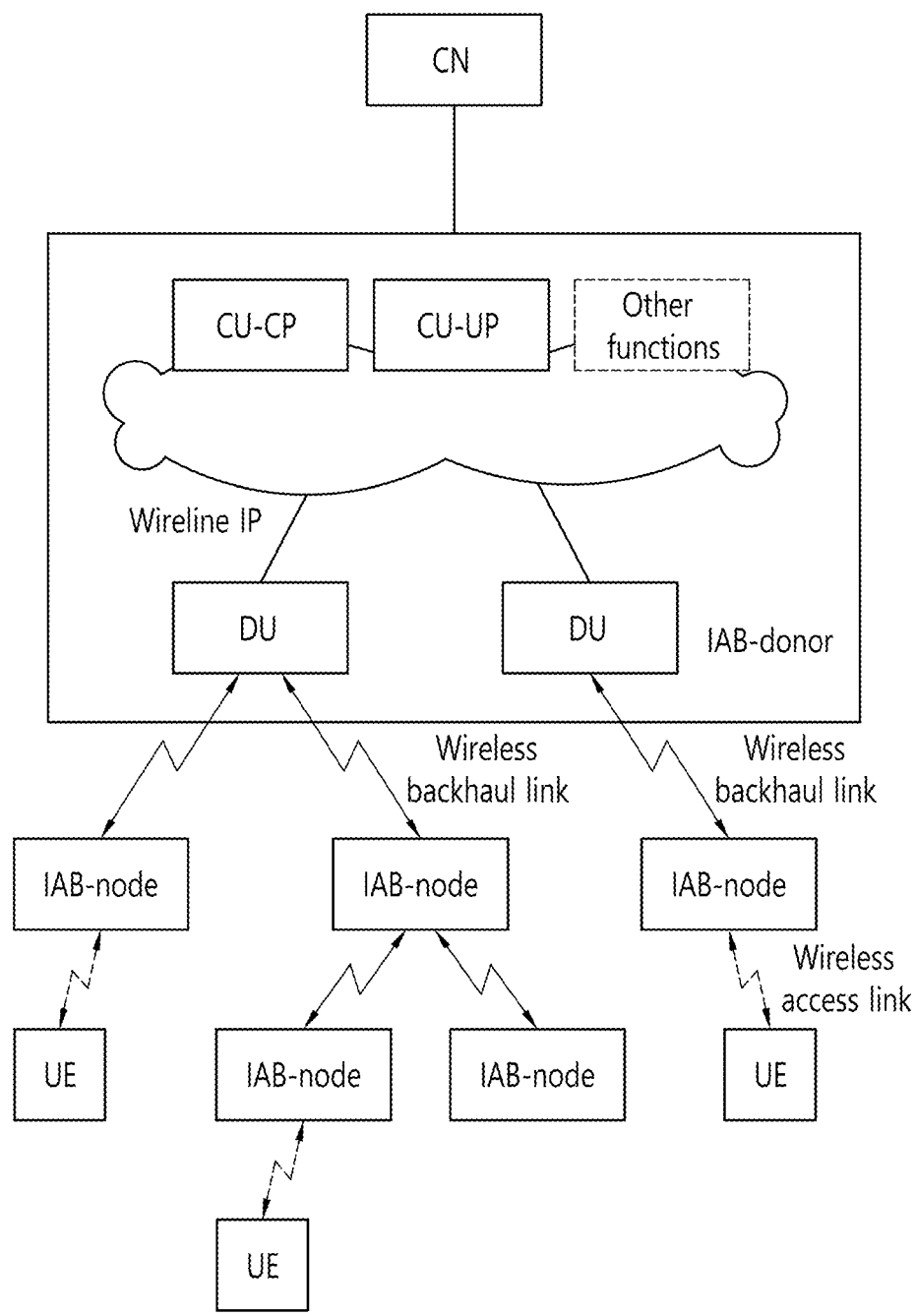
FIG. 7 shows a reference diagram for IAB in standalone mode, which contains one IAB-donor and multiple IAB-nodes, to which the technical features of the present invention can be applied.

FIG. 7 shows a reference diagram for IAB in standalone mode, which contains one IAB-donor and multiple IAB-nodes, to which the technical features of the present invention can be applied. The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

Requirements for use cases and deployment scenarios for IAB are described below.

(1) Relay Deployment Scenarios

A key benefit of IAB is enabling flexible and very dense deployment of NR cells without densifying the transport network proportionately. A diverse range of deployment scenarios can be envisioned including support for outdoor small cell deployments, indoors, or even mobile relays (e.g. on buses or trains).

Accordingly, the Rel. 15 study item shall focus on IAB with physically fixed relays. This requirement does not preclude optimization for mobile relays in future releases.

(2) In-Band Vs. Out-of-Band Backhaul

In-band- and out-of-band backhauling with respect to the access link represent important use cases for IAB. In-band backhauling includes scenarios, where access- and backhaul link at least partially overlap in frequency creating half-duplexing or interference constraints, which imply that the IAB node cannot transmit and receive simultaneously on both links. In the present context, out-of-band scenarios are understood as not posing such constraints.

It is critical to study in-band backhauling solutions that accommodate tighter interworking between access and backhaul in compliance with half-duplexing and interference constraints.

Accordingly, the architectures considered in the study should support in-band and out-of-band scenarios. In-band IAB scenarios including (time division multiplexing (TDM)/frequency division multiplexing (FDM)/spatial division multiplexing (SDM)) of access- and backhaul links subject to half-duplex constraint at the IAB node should be supported. Out-of-band IAB scenarios should also be supported using the same set of RAN features designed for in-band scenarios. The study should identify if additional RAN features are needed for out-of-band scenarios.

(3) Access/Backhaul RAT Options

IAB can support access and backhaul in above-6 GHz- and sub-6 GHz spectrum. The focus of the study is on backhauling of NR-access traffic over NR backhaul links. Solutions for NR-backhauling of LTE-access may be included into the study.

It is further considered critical that Rel. 15 NR UEs can transparently connect to an IAB-node via NR, and that legacy LTE UEs can transparently connect to an IAB-node via LTE in case IAB supports backhauling of LTE access.

Accordingly, NR access over NR backhaul should be studied with highest priority. Additional architecture solutions required for LTE-access over NR-backhaul should be explored. The IAB design shall at least support the following UEs to connect to an IAB-node: 1) Rel. 15 NR UE, 2) legacy LTE UE if IAB supports backhauling of LTE access (4) Standalone and Non-Standalone Deployments IAB can support stand-alone (SA) and non-stand-alone (NSA) deployments. For NSA, relaying of the UE's secondary cell group (SCG) path (NR) is included in the study. Relaying of the UE's master cell group (MCG) path (LTE) is contingent on the support for IAB-based relaying of LTE-access.

The IAB node itself can operate in SA or NSA mode. While SA and NSA scenarios are included in the study, backhauling over the LTE radio interface is excluded from the study. Since E-UTRAN-NR dual connectivity (EN-DC) and SA option 2 represent relevant deployment options for early rollout of NR, EN-DC and SA option 2 for UEs and IAB-nodes has high priority in this study. Other NSA deployment options or combinations of SA and NSA may also be explored and included in the study.

Accordingly, SA and NSA shall be supported for the access link. For an NSA access link, relaying is applied to the NR path. Relaying of the LTE path is contingent on the support of backhauling of LTE traffic. Both NSA and SA shall be studied for the backhaul link. Backhaul traffic over the LTE radio interface is excluded from the study. For NSA access- and backhaul links, the study shall consider EN-DC with priority. However, other NSA options shall not be precluded from the study.

Architecture requirements for IAB are described below.

(1) Multi-Hop Backhauling

Multi-hop backhauling provides more range extension than single hop. This is especially beneficial for above-6 GHz frequencies due to their limited range. Multi-hop backhauling further enables backhauling around obstacles, e.g. buildings in urban environment for in-clutter deployments.

The maximum number of hops in a deployment is expected to depend on many factors such as frequency, cell density, propagation environment, and traffic load. These factors are further expected to change over time. From the architecture perspective, flexibility in hop count is therefore desirable.

With increasing number of hops, scalability issues may arise and limit performance or increase signaling load to unacceptable levels. Capturing scalability to hop count as a key performance indicator (KPI) is therefore an important aspect of the study.

Accordingly, IAB design shall support multiple backhaul hops. The architecture should not impose limits on the number of backhaul hops. The study should consider scalability to hop-count an important KPI. Single hop should be considered a special case of multiple backhaul hops.

(2) Topology Adaptation

Wireless backhaul links are vulnerable to blockage, e.g., due to moving objects such as vehicles, due to seasonal changes (foliage), or due to infrastructure changes (new buildings). Such vulnerability also applies to physically stationary IAB-nodes. Also, traffic variations can create uneven load distribution on wireless backhaul links leading to local link or node congestion.

Topology adaptation refers to procedures that autonomously reconfigure the backhaul network under circumstances such as blockage or local congestion without discontinuing services for UEs.

Accordingly, topology adaptation for physically fixed relays shall be supported to enable robust operation, e.g., mitigate blockage and load variation on backhaul links.

(3) L2- and L3-Relay Architectures

There has been extensive work in 3GPP on Layer 2 (L2) and Layer 3 (L3) relay architectures. Leveraging this work may reduce the standardization effort for IAB. The study can further establish an understanding of the tradeoff between L2- and L3-relaying in the context of IAB.

(4) Core-Network Impact

IAB-related features such as IAB-node integration and topology adaptation may impact core-network specifications. It is desirable to minimize the impact to core-network specifications related to IAB.

Also, dependent on design, IAB features may create additional core-network signaling load. The amount of signaling load may vary among the various designs discussed in the study. Core-network signaling load is therefore considered an important KPI for the comparison of IAB designs.

Accordingly, the IAB design shall strive to minimize the impact to core network specifications. The study should consider the impact to the core network signaling load as an important KPI.

(5) Reuse of Rel-15 NR

Leveraging existing Rel-15 NR specifications can greatly reduce the standardization effort for the backhaul link.

The backhaul link may have additional requirements, which are not addressed in Rel-15 NR. For instance, both link end points of the backhaul link are expected to have similar capabilities. It may therefore be desirable to consider enhancements to Rel-15 NR specifications for the backhaul link.

Accordingly, the study should strive to maximize the reuse of Rel-15 NR specifications for the design of the backhaul link. Enhancement can also be considered.

Figure 8:
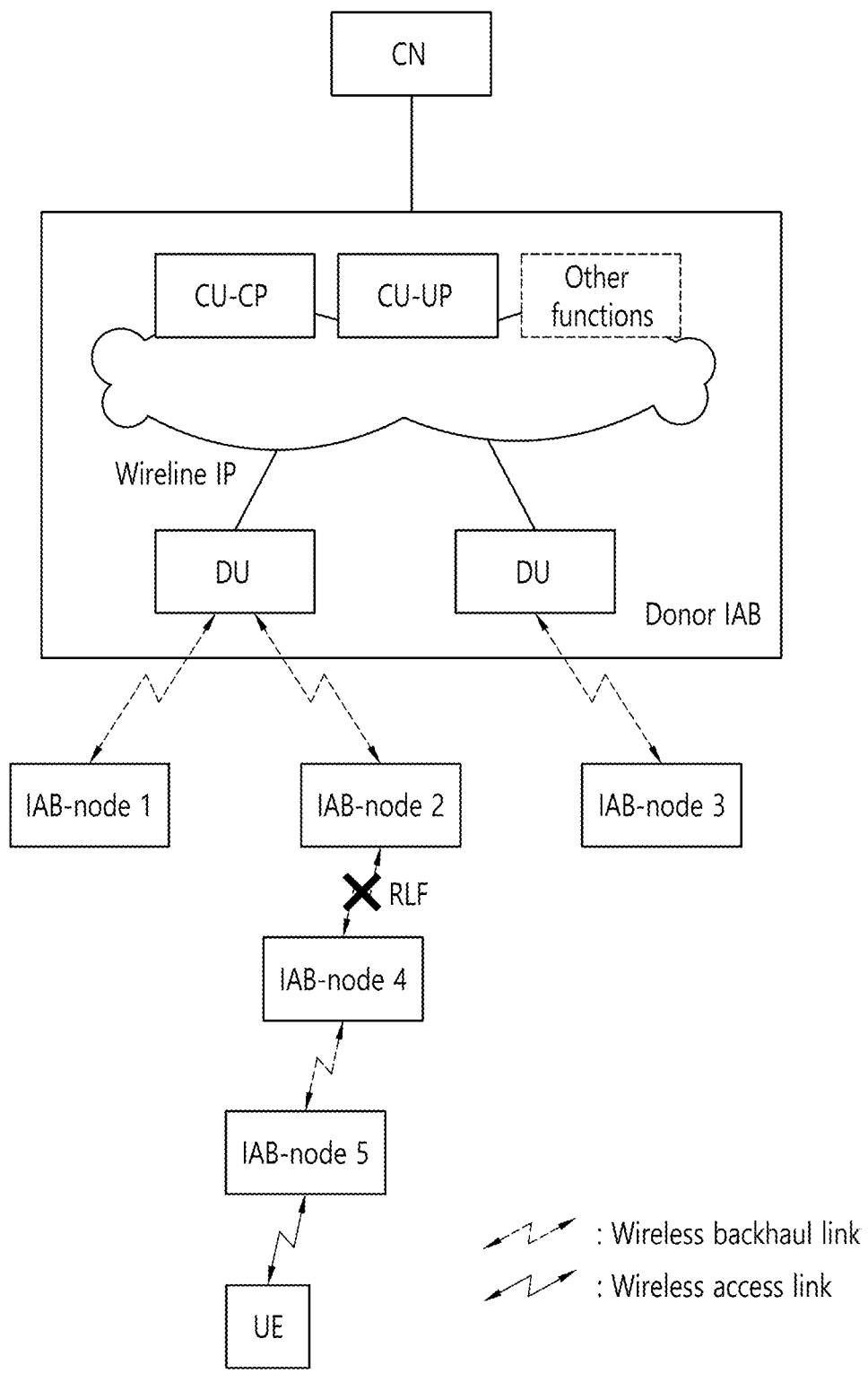
FIG. 8 shows an example of RLF between IAB nodes to which the technical features of the present invention can be applied.

FIG. 8 shows an example of RLF between IAB nodes to which the technical features of the present invention can be applied.

Since IAB node is connected with other IAB nodes and/or donor IAB node based on wireless backhaul link, radio link failure (RLF) on the wireless backhaul link may occur. In legacy LTE, RLF is detected by the UE itself based on the monitoring of the access link. For example, upon a physical layer problem occurs consecutively for a certain period of time or upon problem indication from lower layer on maximum number of (re)transmissions. However, in multi-hop IAB scenario, if the link between intermediate nodes is broken or weak, even if the access link is stable and has good signal quality, the child-IAB node could not be possible to transmit or receive the data. Referring to FIG. 8, even if the connection between the UE and the IAB-node 5 is stable and has good signal quality, if the RLF occurs on the wireless backhaul link between IAB-node 2 and IAB-node 4, the UE could not be possible to transmit or receive the data or signaling.

However, since the quality of the access link of the child-IAB node is not a problem in this case, the child-IAB node could not detect RLF or detect RLF very late, resulting in severe service interruption and delay. In that case, it may be beneficial for the descendant nodes of the child-IAB node or UEs connected to the child-IAB node to find another IAB-node. Referring to FIG. 8, if the RRC connection re-establishment procedure triggered by MT part of IAB-node 2 is failed or the link problem is permanent, the UE is required to release current RRC connection and to perform cell reselection procedure as soon as possible. However, since mobility of the UE in RRC_CONNECTED is possible only by the RRC message, and the RRC layer may only exist at the donor IAB node in some IAB network architecture (IAB-node 2 may have only PHY/MAC/RLC layers). In this case, it is impossible for the UE to receive RRC message for redirection and/or reconfiguration of the current RRC connection immediately. Even if the UE receives RRC message for redirection and/or reconfiguration of the current RRC connection, delay will occur and the latency requirement will not be satisfied. Therefore, particular handling may be needed to solve these problems.

Figure 9:
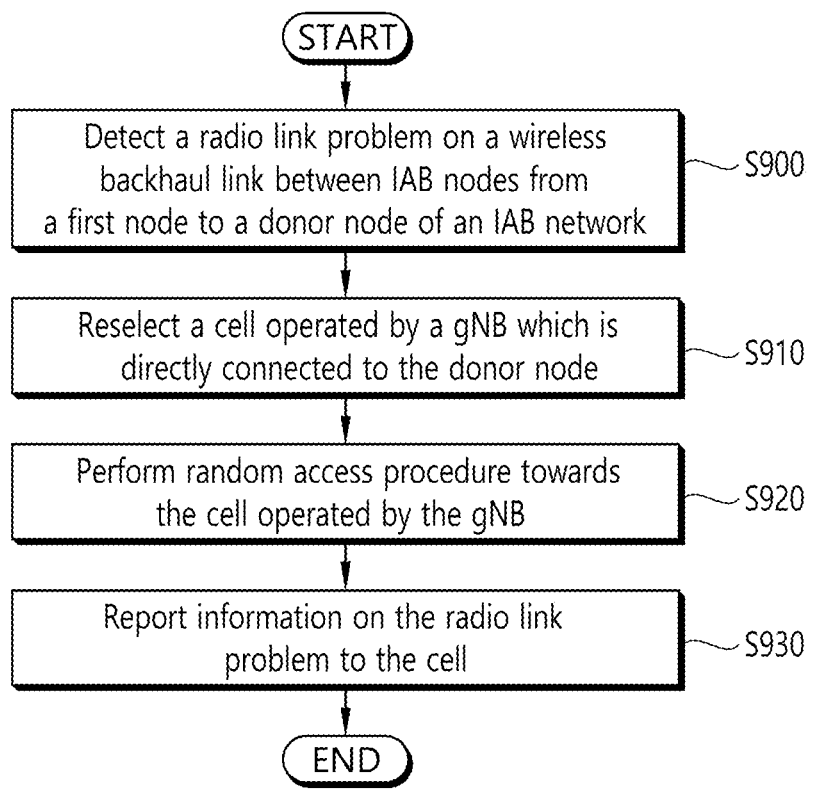
FIG. 9 shows an example of a method for supporting a fast link recovery and link status reporting according to an embodiment of the present invention.

FIG. 9 shows an example of a method for supporting a fast link recovery and link status reporting according to an embodiment of the present invention.

In this embodiment, it is assumed that the donor node of the IAB network is connected to 5G core network and the multiple IAB nodes are connected to the donor node via Uu. In the description below, the node may include a UE. The node may include an IAB node which is directly/indirectly connected to the UE (i.e. access RAN node). The IAB node may include both MT part which is used to receive signaling/data from parent node, and UE part which is used to transmit signaling/data to childe node. The MT part of the IAB node may include (or consist of) PHY/MAC/RLC layers, the UE part of the IAB node may also include (or consist of) PHY/MAC/RLC layers. The IAB node may not be a donor node. The IAB node may be directly/indirectly connected to the donor node. The donor node is the most superordinate node of the IAB network, and includes CU and DU. Every path of the IAB network may be selected/configured/formed by the donor node. The wireless backhaul link between IAB nodes may be called by other names, such as RLC channel.

Furthermore in the embodiment, gNB may mean the RAN node which has a connection with the donor node directly. The gNB may not belongs to the IAB network. Therefore, gNB may include PDCP/RRC layers as well as PHY/MAC/RLC layers, not like the IAB node. The gNB may be in proximity of the node. In the description below, it may be assumed that the node can know which RAN node has a direct connection with the donor node.

In step S900, the node detects a radio link problem on a wireless backhaul link between IAB nodes from the node to a donor node of an IAB network. Examples of the radio link problem may include the followings.

Radio link failure (RLF); and/or

When a specific criteria of RSRP threshold (may be received from network) is not satisfied; and/or When a specific criteria of throughput threshold (may be received from network) is not satisfied.

In step S910, the node reselects a cell operated by a gNB which is directly connected to the donor node. As mentioned above, the gNB may not belongs to the IAB network. The gNB may be in proximity of the node.

For reselecting the cell operated by the gNB which has a direct connection with the donor node, an offset may be applied to the cell. The offset may be configured by the network, and/or may be pre-configured/stored in the MT part of the node. The cell may be reselected based on an RSRP of the cell. For example, the cell may be reselected when the measured RSRP of the cell is better than any other gNBs and/or when the measured RSRP of the gNB is better than other IAB nodes.

Furthermore, an access priority may be applied to the cell for reselecting the cell, even when an RSRP of the cell is worse than IAB nodes in proximity. The access priority may be configured by the network, and/or may be pre-configured/stored in the MT part of the node.

In step S920, the node performs a random access procedure towards the cell operated by the gNB. The node may perform the random access procedure in order to report the occurrence of the radio link problem on the wireless backhaul link between IAB nodes.

After establishing an RRC connection with the cell, in step S930, the node reports information on the radio link problem to the cell. The information on the radio link problem may include IDs of the IAB nodes on which the radio link problem occurs and/or an ID of the donor node. Therefore, the gNB and/or the donor node which will receive the above information from the gNB can aware of the wireless backhaul link on which the radio link problem occurs. Furthermore, the information on the radio link problem includes an ID of an IAB node of which measured RSP is better than any other IAB nodes. This information may be used to perform a fast path reselection by the donor node.

Upon receiving the information on the radio link problem from the node, the serving gNB may inform the information on the radio link problem to the donor node via X2/Xn interface. A new path from the donor node to the node may be selected by the donor node based on the reported information. Or, the new path may be selected by NR core network.

According to the embodiment of the present invention shown in FIG. 9, when a link problem occurs on a wireless backhaul link, fast recovery and fast problem reporting can be possible by reselecting a cell operated by the gNB which is directly connected to the donor node of the IAB network. Consequently, a new path in the IAB network can be established by the donor node or core network.

Figure 10:
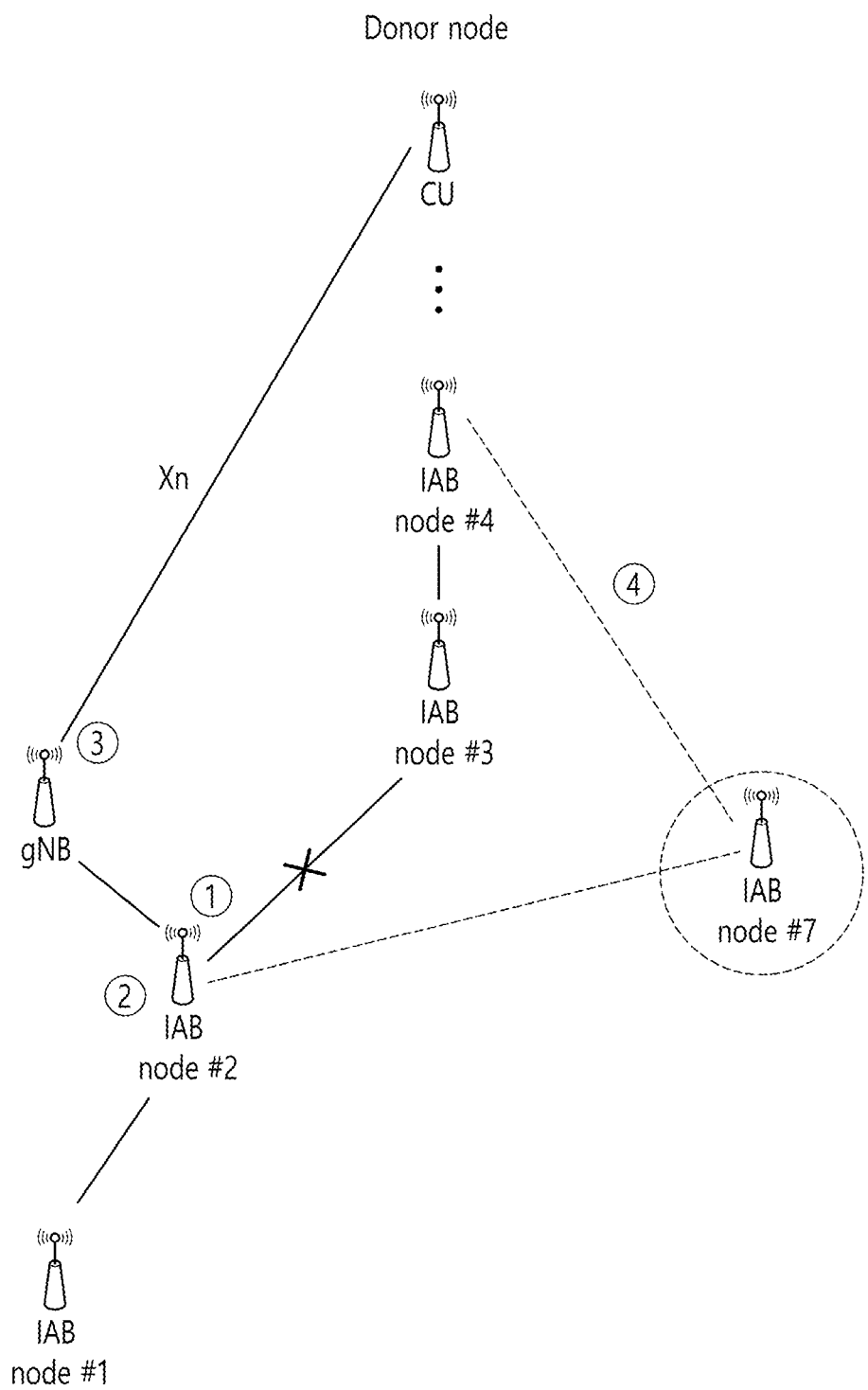
FIG. 10 shows an example of a cell selection according to an embodiment of the present invention.

FIG. 10 shows an example of a cell selection according to an embodiment of the present invention.

(1) IAB-node 2 detects radio link problem on wireless backhaul link between IAB-node 2 and IAB-node 3.

(2) The IAB-node 2 performs a cell reselection and re-selects a cell operated by the gNB which has a direct connection with the donor node. After re-selecting the cell, the IAB-node 2 performs random access procedure with the gNB and reports information on the radio link problem (i.e. ID of IAB nodes-2/3, ID of the donor node).

(3) The serving gNB forwards the reported information on the radio link problem to the donor node.

(4) A new path can be established. Instead of the wireless backhaul link with the AIB node-3, the IAB-node 2 can communication via the new path with IAB node-7.

Figure 11:
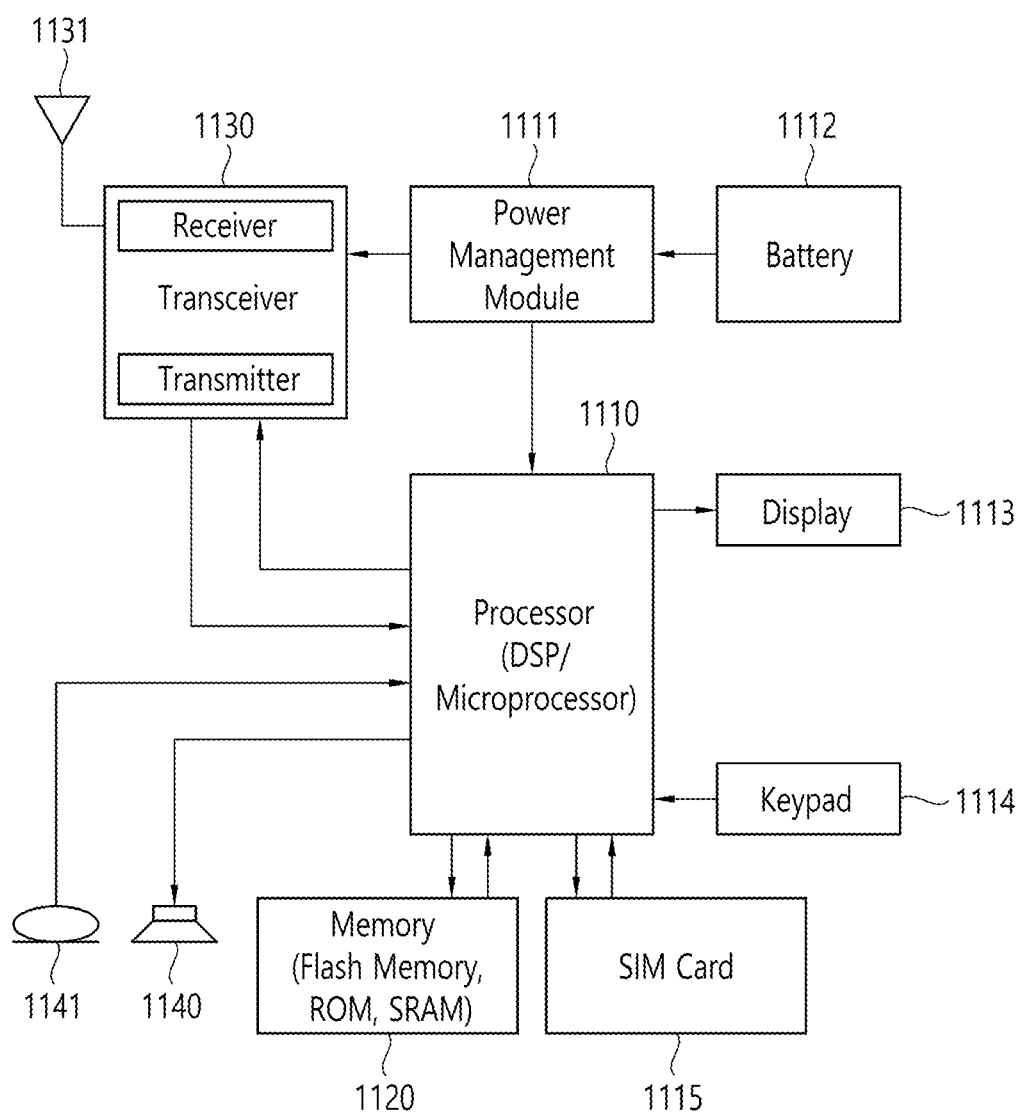
FIG. 11 shows a node to which the technical features of the present invention can be applied.

FIG. 11 shows a node to which the technical features of the present invention can be applied.

A node includes a processor 1110, a power management module 1111, a battery 1112, a display 1113, a keypad 1114, a subscriber identification module (SIM) card 1115, a memory 1120, a transceiver 1130, one or more antennas 1131, a speaker 1140, and a microphone 1141.

The processor 1110 may be configured to implement proposed functions, procedures and/or methods described in this description. Layers of the radio interface protocol may be implemented in the processor 1110. The processor 1110 may include application-specific integrated circuit (ASIC), other chipset, logic circuit and/or data processing device. The processor 1110 may be an application processor (AP). The processor 1110 may include at least one of a digital signal processor (DSP), a central processing unit (CPU), a graphics processing unit (GPU), a modem (modulator and demodulator). An example of the processor 1110 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1110 is configured to detect a radio link problem on a wireless backhaul link between IAB nodes from the node to a donor node of an IAB network. Examples of the radio link problem may include the followings.

RLF; and/or

When a specific criteria of RSRP threshold (may be received from network) is not satisfied; and/or When a specific criteria of throughput threshold (may be received from network) is not satisfied.

The processor 1110 is configured to reselect a cell operated by a gNB which is directly connected to the donor node. The gNB may not belongs to the IAB network. The gNB may be in proximity of the node.

For reselecting the cell operated by the gNB which has a direct connection with the donor node, an offset may be applied to the cell. The offset may be configured by the network, and/or may be pre-configured/stored in the MT part of the node. The cell may be reselected based on an RSRP of the cell. For example, the cell may be reselected when the measured RSRP of the cell is better than any other gNBs and/or when the measured RSRP of the gNB is better than other IAB nodes.

Furthermore, an access priority may be applied to the cell for reselecting the cell, even when an RSRP of the cell is worse than IAB nodes in proximity. The access priority may be configured by the network, and/or may be pre-configured/stored in the MT part of the node.

The processor 1110 is configured to perform a random access procedure towards the cell operated by the gNB. The processor 1110 may be configured to perform the random access procedure in order to report the occurrence of the radio link problem on the wireless backhaul link between IAB nodes.

After establishing an RRC connection with the cell, the processor 1110 is configured to control the transceiver 1130 to report information on the radio link problem to the cell. The information on the radio link problem may include IDs of the IAB nodes on which the radio link problem occurs and/or an ID of the donor node. Therefore, the gNB and/or the donor node which will receive the above information from the gNB can aware of the wireless backhaul link on which the radio link problem occurs. Furthermore, the information on the radio link problem includes an ID of an IAB node of which measured RSP is better than any other IAB nodes. This information may be used to perform a fast path reselection by the donor node.

The power management module 1111 manages power for the processor 1110 and/or the transceiver 1130. The battery 1112 supplies power to the power management module 1111. The display 1113 outputs results processed by the processor 1110. The keypad 1114 receives inputs to be used by the processor 1110. The keypad 1114 may be shown on the display 1113. The SIM card 1115 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1120 is operatively coupled with the processor 1110 and stores a variety of information to operate the processor 1110. The memory 1120 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1120 and executed by the processor 1110. The memory 1120 can be implemented within the processor 1110 or external to the processor 1110 in which case those can be communicatively coupled to the processor 1110 via various means as is known in the art.

The transceiver 1130 is operatively coupled with the processor 1110, and transmits and/or receives a radio signal. The transceiver 1130 includes a transmitter and a receiver. The transceiver 1130 may include baseband circuitry to process radio frequency signals. The transceiver 1130 controls the one or more antennas 1131 to transmit and/or receive a radio signal.

The speaker 1140 outputs sound-related results processed by the processor 1110. The microphone 1141 receives sound-related inputs to be used by the processor 1110.

According to the embodiment of the present invention shown in FIG. 11, when a link problem occurs on a wireless backhaul link, fast recovery and fast problem reporting can be possible by reselecting a cell operated by the gNB which is directly connected to the donor node of the IAB network. Consequently, a new path in the IAB network can be established by the donor node or core network.

The present invention may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 12:
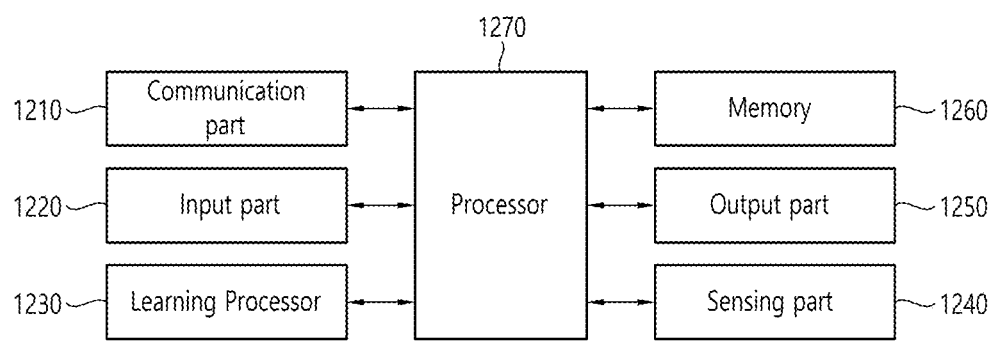
FIG. 12 shows an example of an AI device to which the technical features of the present invention can be applied.

FIG. 12 shows an example of an AI device to which the technical features of the present invention can be applied.

The AI device 1200 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 12, the AI device 1200 may include a communication part 1210, an input part 1220, a learning processor 1230, a sensing part 1240, an output part 1250, a memory 1260, and a processor 1270.

The communication part 1210 can transmit and/or receive data to and/or from external devices such as the AI devices and the AI server using wire and/or wireless communication technology. For example, the communication part 1210 can transmit and/or receive sensor information, a user input, a learning model, and a control signal with external devices. The communication technology used by the communication part 1210 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1220 can acquire various kinds of data. The input part 1220 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1220 can acquire input data to be used when acquiring an output using learning data and a learning model for model learning. The input part 1220 may obtain raw input data, in which case the processor 1270 or the learning processor 1230 may extract input features by preprocessing the input data.

The learning processor 1230 may learn a model composed of an ANN using learning data. The learned ANN can be referred to as a learning model. The learning model can be used to infer result values for new input data rather than learning data, and the inferred values can be used as a basis for determining which actions to perform. The learning processor 1230 may perform AI processing together with the learning processor of the AI server. The learning processor 1230 may include a memory integrated and/or implemented in the AI device 1200. Alternatively, the learning processor 1230 may be implemented using the memory 1260, an external memory directly coupled to the AI device 1200, and/or a memory maintained in an external device.

The sensing part 1240 may acquire at least one of internal information of the AI device 1200, environment information of the AI device 1200, and/or the user information using various sensors. The sensors included in the sensing part 1240 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1250 may generate an output related to visual, auditory, tactile, etc. The output part 1250 may include a display unit for outputting visual information, a speaker for outputting auditory information, and/or a haptic module for outputting tactile information. The memory 1260 may store data that supports various functions of the AI device 1200.

For example, the memory 1260 may store input data acquired by the input part 1220, learning data, a learning model, a learning history, etc.

The processor 1270 may determine at least one executable operation of the AI device 1200 based on information determined and/or generated using a data analysis algorithm and/or a machine learning algorithm. The processor 1270 may then control the components of the AI device 1200 to perform the determined operation. The processor 1270 may request, retrieve, receive, and/or utilize data in the learning processor 1230 and/or the memory 1260, and may control the components of the AI device 1200 to execute the predicted operation and/or the operation determined to be desirable among the at least one executable operation. The processor 1270 may generate a control signal for controlling the external device, and may transmit the generated control signal to the external device, when the external device needs to be linked to perform the determined operation. The processor 1270 may obtain the intention information for the user input and determine the user's requirements based on the obtained intention information. The processor 1270 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1230 and/or learned by the learning processor of the AI server, and/or learned by their distributed processing.

The processor 1270 may collect history information including the operation contents of the AI device 1200 and/or the user's feedback on the operation, etc. The processor 1270 may store the collected history information in the memory 1260 and/or the learning processor 1230, and/or transmit to an external device such as the AI server. The collected history information can be used to update the learning model. The processor 1270 may control at least some of the components of AI device 1200 to drive an application program stored in memory 1260. Furthermore, the processor 1270 may operate two or more of the components included in the AI device 1200 in combination with each other for driving the application program.

Figure 13:
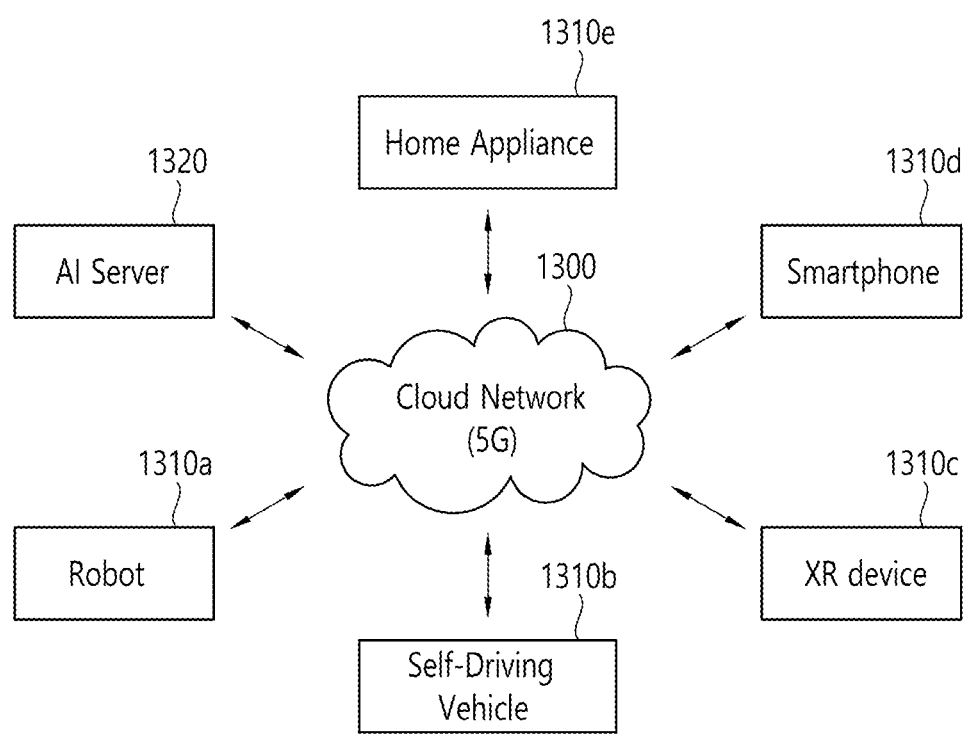
FIG. 13 shows an example of an AI system to which the technical features of the present invention can be applied.

FIG. 13 shows an example of an AI system to which the technical features of the present invention can be applied.

Referring to FIG. 13, in the AI system, at least one of an AI server 1320, a robot 1310a, an autonomous vehicle 1310b, an XR device 1310c, a smartphone 1310d and/or a home appliance 1310e is connected to a cloud network 1300. The robot 1310a, the autonomous vehicle 1310b, the XR device 1310c, the smartphone 1310d, and/or the home appliance 1310e to which the AI technology is applied may be referred to as AI devices 1310a to 1310e.

The cloud network 1300 may refer to a network that forms part of a cloud computing infrastructure and/or resides in a cloud computing infrastructure. The cloud network 1300 may be configured using a 3G network, a 4G or LTE network, and/or a 5G network. That is, each of the devices 1310a to 1310e and 1320 consisting the AI system may be connected to each other through the cloud network 1300. In particular, each of the devices 1310a to 1310e and 1320 may communicate with each other through a base station, but may directly communicate with each other without using a base station.

The AI server 1300 may include a server for performing AI processing and a server for performing operations on big data. The AI server 1300 is connected to at least one or more of AI devices constituting the AI system, i.e. the robot 1310a, the autonomous vehicle 1310b, the XR device 1310c, the smartphone 1310d and/or the home appliance 1310e through the cloud network 1300, and may assist at least some AI processing of the connected AI devices 1310a to 1310e. The AI server 1300 can learn the ANN according to the machine learning algorithm on behalf of the AI devices 1310a to 1310e, and can directly store the learning models and/or transmit them to the AI devices 1310a to 1310e. The AI server 1300 may receive the input data from the AI devices 1310a to 1310e, infer the result value with respect to the received input data using the learning model, generate a response and/or a control command based on the inferred result value, and transmit the generated data to the AI devices 1310a to 1310e. Alternatively, the AI devices 1310a to 1310e may directly infer a result value for the input data using a learning model, and generate a response and/or a control command based on the inferred result value.

Various embodiments of the AI devices 1310a to 1310e to which the technical features of the present invention can be applied will be described. The AI devices 1310a to 1310e shown in FIG. 13 can be seen as specific embodiments of the AI device 1200 shown in FIG. 12.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a node in a wireless communication system, the method comprising:
    detecting a radio link problem on a wireless backhaul link between integrated access and backhaul (IAB) nodes from the node to a donor node of an IAB network;
    reselecting a cell operated by a gNB which is directly connected to the donor node via X2 interface and/or Xn interface, wherein the gNB does not belong to the IAB network;
    performing a random access procedure towards the cell operated by the gNB;
    reporting, to the cell, information regarding the radio link problem, wherein the information includes (i) identifiers (IDs) of the IAB nodes having the radio link problem, (ii) an ID of a specific IAB node of which measured RSRP is better than that of any other IAB nodes, and (iii) an ID of the donor node, wherein the information is forwarded to the donor node via the cell based on the ID of the donor node included in the reported information; and
    establishing a new path from the donor node to the node in the IAB network,
    wherein the new path is selected by the donor node based on (i) the IDs of the IAB nodes having the radio link problem and (ii) the ID of the specific IAB node included in the reported information.

2. The method of claim 1, wherein the gNB is in proximity of the node.

3. The method of claim 1, wherein the radio link problem includes a radio link failure (RLF), a case that a specific criteria of a reference signal received power (RSRP) threshold is not satisfied and/or a case that a specific criteria of throughput threshold is not satisfied.

4. The method of claim 1, wherein an offset is applied to the cell.

5. The method of claim 1, wherein the cell is reselected based on an RSRP of the cell.

6. The method of claim 5, wherein the RSRP of the cell is better than any other cells of other gNBs or other IAB nodes.

7. The method of claim 1, wherein an access priority is applied to the cell even when an RSRP of the cell is worse than IAB nodes in proximity.

8. The method of claim 1, wherein the node includes an IAB node including both a user equipment (UE) part and a mobile terminating (MT) part.

9. The method of claim 1, wherein the node includes a UE.

10. The method of claim 1, wherein the donor node includes a central unit (CU) and a distributed unit (DU).

11. The method of claim 1, wherein the first node is in communication with at least one of a user equipment, a network, and/or autonomous vehicles other than the first node.

12. The method of claim 1, wherein the new path includes the specific IAB node.

13. A node configured to operate in a wireless communication system, the node comprising:
    a memory;
    a transceiver; and
    a processor, operably coupled to the memory and the transceiver, wherein the processor is configured to:
    detect a radio link problem on a wireless backhaul link between integrated access and backhaul (IAB) nodes from the node to a donor node of an IAB network,
    reselect a cell operated by a gNB which is directly connected to the donor node via X2 interface and/or Xn interface, wherein the gNB does not belong to the IAB network,
    perform a random access procedure towards the cell operated by the gNB,
    control the transceiver to report, to the cell, information regarding the radio link problem, wherein the information includes (i) identifiers (IDs) of the IAB nodes having the radio link problem, (ii) an ID of a specific IAB node of which measured RSRP is better than that of any other IAB nodes, and (iii) an ID of the donor node, wherein the information is forwarded to the donor node via the cell based on the ID of the donor node included in the reported information; and
    establish a new path from the donor node to the node in the IAB network,
    wherein the new path is selected by the donor node based on (i) the IDs of the IAB nodes having the radio link problem and (ii) the ID of the specific IAB node included in the reported information.

14. A processor configured to control a node to operate in a wireless communication system, wherein the processor is configured to:
    detect a radio link problem on a wireless backhaul link between integrated access and backhaul (IAB) nodes from the node to a donor node of an IAB network,
    reselect a cell operated by a gNB which is directly connected to the donor node via X2 interface and/or Xn interface, wherein the gNB does not belong to the IAB network,
    perform a random access procedure towards the cell operated by the gNB, and
    control the node to report, to the cell, information regarding the radio link problem, wherein the information includes (i) identifiers (IDs) of the IAB nodes having the radio link problem, (ii) an ID of a specific IAB node of which measured RSRP is better than that of any other IAB nodes, and (iii) an ID of the donor node, wherein the information is forwarded to the donor node via the cell based on the ID of the donor node included in the reported information; and
    establish a new path from the donor node to the node in the IAB network,
    wherein the new path is selected by the donor node based on (i) the IDs of the IAB nodes having the radio link problem and (ii) the ID of the specific IAB node included in the reported information.

* * * * *